United States Patent
Cox et al.

[15] 3,671,711
[45] June 20, 1972

[54] HONEYCOMB RIBBON PAD MANUFACTURING APPARATUS

[72] Inventors: Frederick L. Cox; Jack E. Krumreich, both of Terre Haute, Ind.

[73] Assignee: Tri-Industries, Inc., Terre Haute, Ind.

[22] Filed: May 20, 1970

[21] Appl. No.: 38,994

[52] U.S. Cl. .................................................. 219/117 HD
[51] Int. Cl. ....................................................... B23k 11/10
[58] Field of Search ........................................... 219/117, 91

[56] References Cited

UNITED STATES PATENTS

| | | | |
|---|---|---|---|
| 3,051,824 | 8/1962 | Wilson | 219/117 H |
| 2,821,616 | 1/1958 | Spott | 219/117 HD |
| 2,843,722 | 7/1958 | Wegeforth | 219/117 HD |
| 3,079,487 | 2/1963 | Rohr | 219/83 |

Primary Examiner—J. V. Truhe
Assistant Examiner—J. G. Smith
Attorney—Woodard, Weikart, Emhardt & Naughton

[57] ABSTRACT

An apparatus to assemble and weld corrugated metal ribbon to form a honeycomb pad. A horizontal feeding mechanism is provided by a pair of clamping arrangements one mounted on a stationary base and one mounted on a horizontally movable carriage which moves the one clamping arrangement toward and away from the other. The movable carriage has mounted thereon a ribbon pressure pad and an alignment pin. An air cylinder on said carriage moves the ribbon pressure pad and alignment pin toward the corrugated ribbons until the pointed alignment pin is projecting into a cell between the ribbons and the ribbons are oriented. The air cylinder moves the pressure pad into the resilient contact with the ribbons holding them in a flat uniform condition while a carriage mounted welding electrode is moved into contact with the ribbons for welding them together.

9 Claims, 6 Drawing Figures

Patented June 20, 1972

INVENTOR.
FREDERICK L. COX &
JACK E. KRUMREICH
BY
Woodard, Weikart, Emhardt & Naughton
ATTORNEYS INVENTOR.
FREDERICK L. COX &
JACK E. KRUMREICH
BY
Woodard, Weikart, Emhardt & Naughton
ATTORNEYS

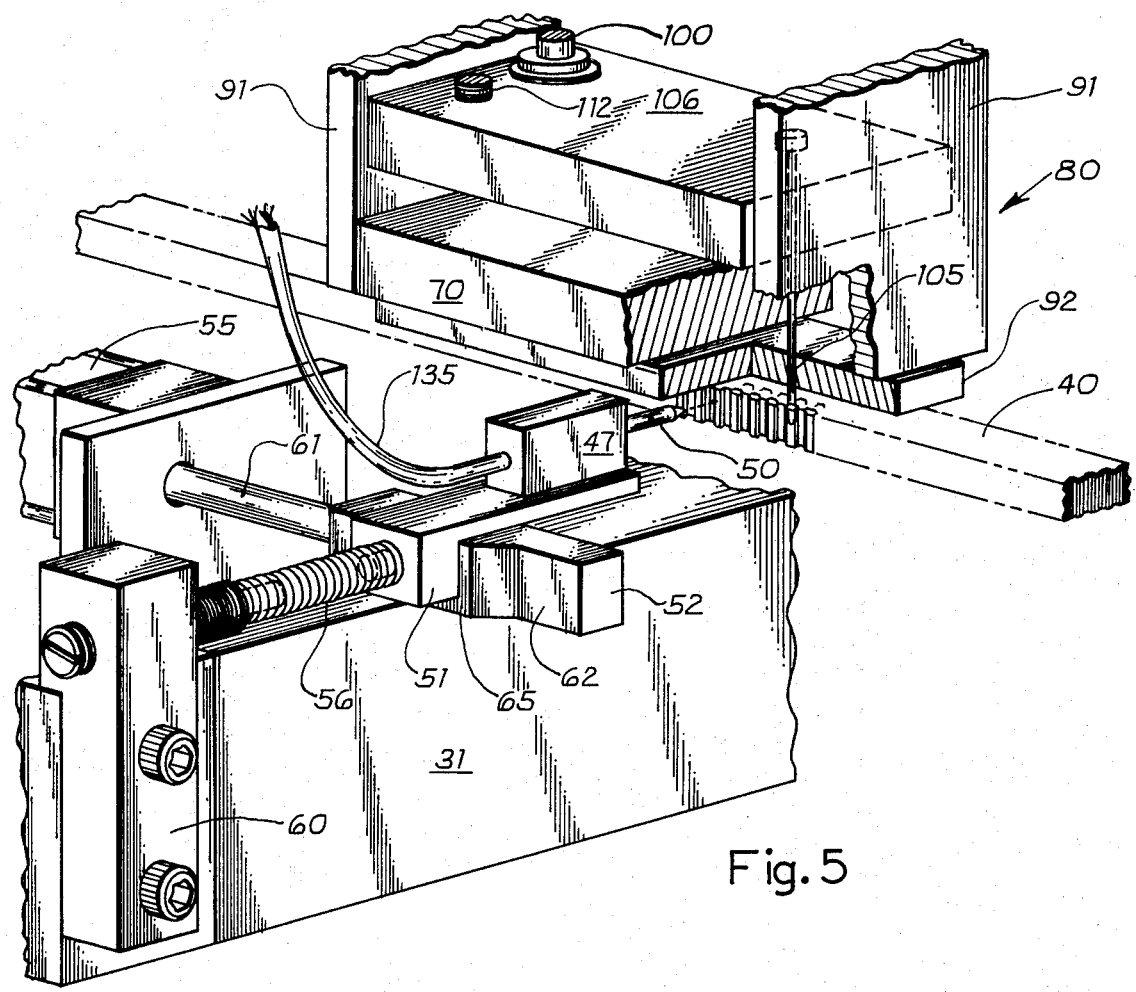

3,671,711

HONEYCOMB RIBBON PAD MANUFACTURING APPARATUS

BACKGROUND OF THE INVENTION

1. Field of the Invention

This invention relates to an apparatus for manufacturing honeycomb ribbon pad.

2. Description of the Prior Art

Metal honeycomb pad is very useful in aircraft and is used, for example, in jet engines to provide a good seal between the engine rotor and the rotor housing. Such metal honeycomb pad is very expensive to manufacture, however, because it requires a large number of individual electric spot welds. It is present practice to manufacture such honeycomb pad manually by first corrugating the plain ribbon then assembling the ribbon by hand with or without a fixture. The assembly is then spot welded by hand to produce the pad. The quality of the honeycomb pads i.e. flatness, node alignment, position of spot welds and uniformity of spot welds depend entirely on operator dexterity. Also the rate of fabrication of the honeycomb pad depends on the ability of the operator. It is desirable therefore that apparatus be provided for increasing the rate of producing honeycomb pad as well as improving the quality of the honeycomb pad.

SUMMARY OF THE INVENTION

One embodiment of the invention might include honeycomb ribbon pad manufacturing apparatus comprising a base, a first clamping meanS mounted on said base and adapted to grip and hold the pad relative to the base, a carriage movably mounted on said base for movement toward and away from said first clamping means, a second clamping means mounted on said carriage and adapted to grip the ribbons of said pad and hold them relative to said carriage, a welding electrode mounted on said carriage and movable into and out of engagement with said ribbons, and means for aligning and holding the ribbons relative to one another and in predetermined relation to said electrode while welding is accomplished whereby a flat well aligned honeycomb pad is formed.

Objects of the invention are to provide apparatus for making uniform honeycomb pad; to provide apparatus for making honeycomb pad which reduces the cost of fabrication of honeycomb pad and permits adjustment as to welds at every node or at selected intervals.

BRIEF DESCRIPTION OF THE DRAWINGS

FIG. 5 is an enlarged fragmentary perspective view taken generally along the line 5—5 of FIG. 2 in the direction of the arrows; and FIG. 6 is a schematic diagram of the apparatus illustrating the operation thereof.

DESCRIPTION OF THE PREFERRED EMBODIMENT

Figure 1:
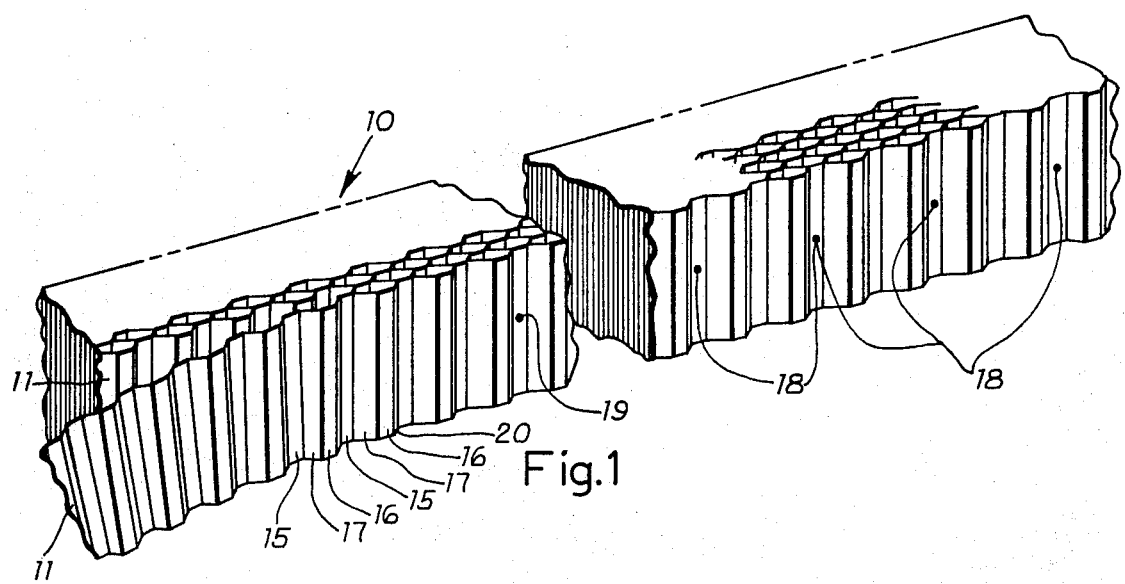
FIG. 1 is a perspective view of honeycomb ribbon pad as manufactured by the apparatus of this invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a honeycomb pad 10 made up of metal corrugated ribbons 11 welded together to form a honeycomb pattern. Each of the ribbons includes parallel portions 15 and 16 which are joined by sloping portions 17 and 20 connecting the parallel portions 15 and 16. The portions 15 and 16 are parallel and extend in the direction of the length of the hOneycomb. The portions 17 are all parallel to one another and the portions 20 are all parallel to one another. At predetermined intervals the portions 15 of one ribbon are spot welded at 18 by the apparatus to the portions 16 of the adjacent ribbon. Prior to entering the apparatus the ribbons are hand tack welded by welds 19 at spaced intervals to orient the ribbons.

Figure 2:
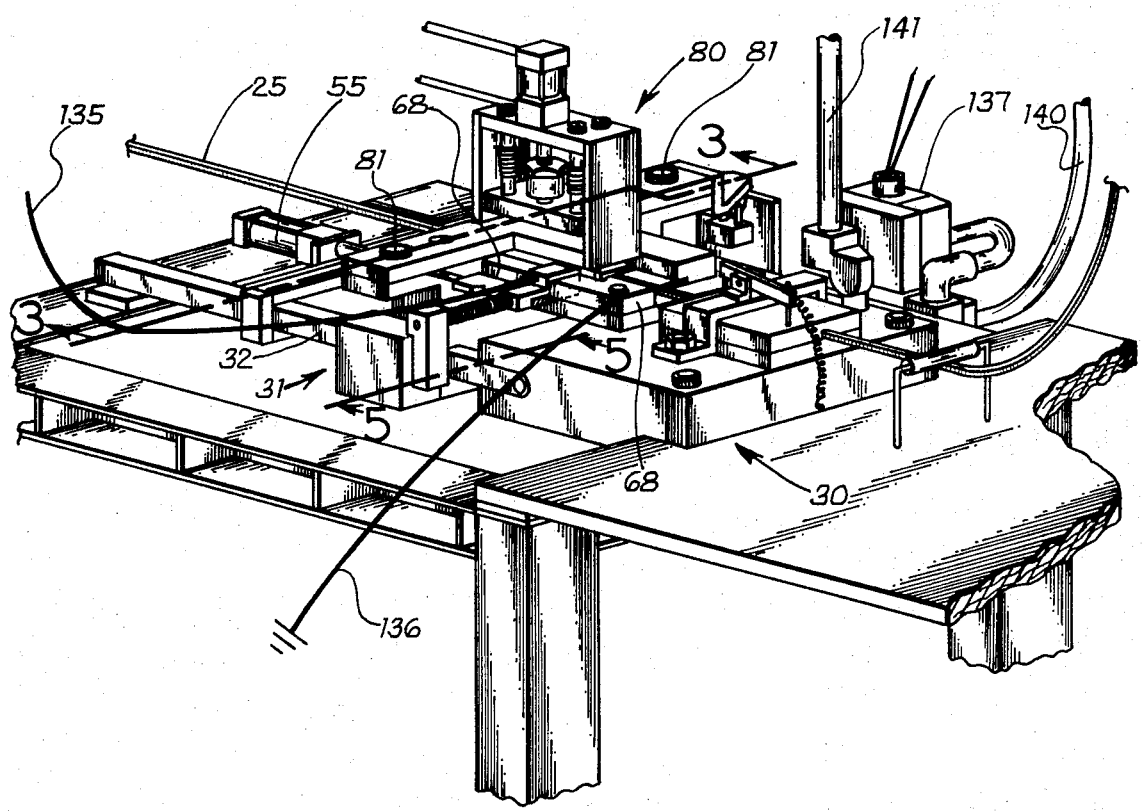
FIG. 2 is a perspective view of the honeycomb ribbon pad manufacturing apparatus of this invention.

Referring now to FIG. 2, the honeycomb pad is manufactured in a large loop 25 (shown broken). In order to start the loop a single length of corrugated ribbon 11 is threaded through the apparatus and is brought around and tack welded to itself to close the loop. The tack welded portion is then started through the apparatus whereupon the apparatus automatically welds the additional ribbon material to the first loop of ribbon material. The pad is moved through the apparatus a number of times depending on the number of layers of ribbon material desired in the loop of honeycomb pad. Prior to each additional layer of ribbon passing into the apparatus, the ribbon is tack welded in proper orientation to the next adjacent layer of ribbon in the pad. After the manufacturing process is complete, the loop is cut at the joint of beginning and a length of honeycomb pad is provided.

In FIG. 2, a stationary base 30 has a carriage 31 mounted thereon for horizontal movement. The carriage 31 is slidably mounted on guide rails 32 fixed to the base 30. An air cylinder motor 35 has its piston 36 fixed to the carriage 31 for horizontal movement of the carriage. An anvil 37 is fixed to the carriage 31 and forms the supporting surface for the honeycomb pad 40. Also fixed to the carriage is a back up member 41 which provides a surface against which springs 42 act to resiliently bias guide member 45 against the honeycomb ribbon pad 40. The springs 42 act between member 41 and a mounting member 46 upon which guide member 45 is mounted.

Also mounted on the carriage 31 is an electrode guide 47 which is formed of electrical insulating material. The electrode guide fixedly receives the electrode 50 and is fixedly mounted upon a cammed member 51. The cammed member 51 is acted upon by a cam 52 which is arranged to move perpendicularly to the plane of FIG. 3. FIG. 5 shows the electrode 50 and associated structure in more detail. The cam 52 is projected and retracted by an air cylinder motor 55 fixedly mounted on the carriage 31. The member 51 is guided by the carriage 31 and guide means 68 (FIG. 2) so that the member 51 moves only transverse to the direction of movement of the carriage as caused by the cylinder 35. A compression spring 56 acts between member 51 and a post 60 fixed to the carriage 31. When the piston rod 61 of the cylinder 55 is retracted, the cam surface 62 is in contact with the member 51 and the spring 56 holds the member 51 against the surface 62 so that the electrode 50 is in contact with the honeycomb pad as shown, for example, in FIG. 3. When the piston rod 61 is projected, the cam surface 65 is in contact with the member 51 and the spring 56 holds the member 51 against the surface 65 so that the electrode is out of contact with the honeycomb pad as shown, for example, in FIG. 5.

The anvil 37 has fixed thereto guide means 68 (FIG. 2) which operate to guide the leftward surface of the ribbon or honeycomb pad (as viewed in FIG. 3) as it moves on the carriage 31 and 80. The springs 42 and member 45 hold the pad against the guide means 68.

Figure 3:
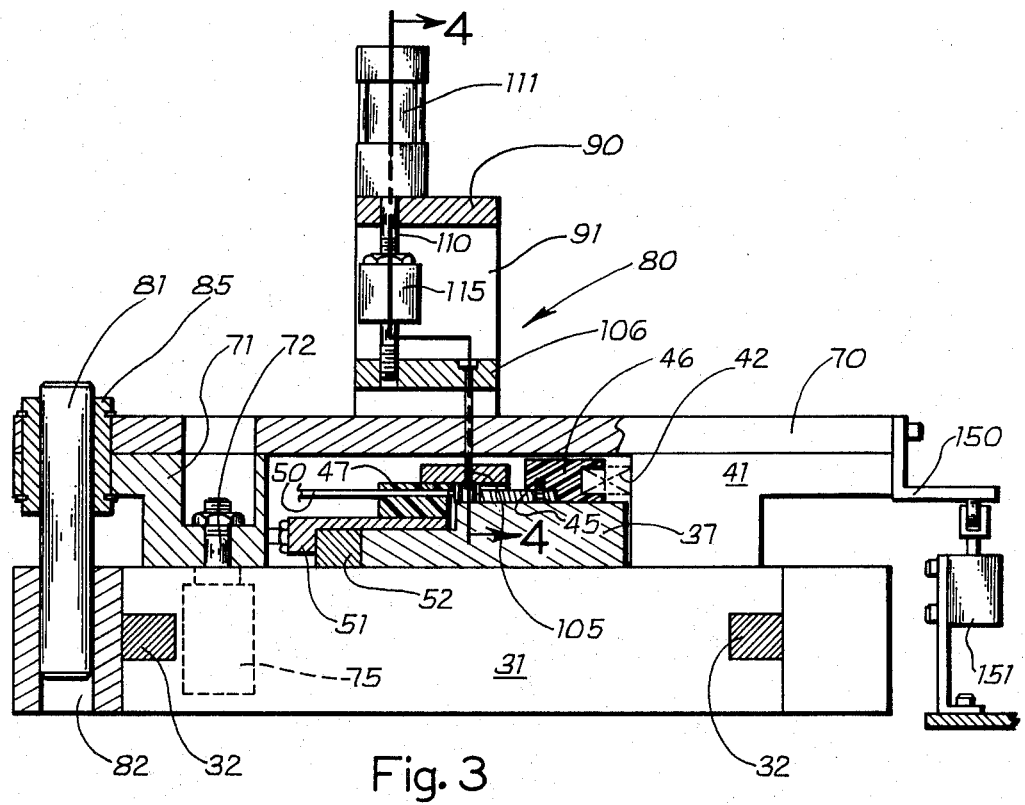
FIG. 3 is a vertical section taken along the line 3—3 of FIG. 2 in the direction of the arrows.

Also fixed to the carriage is a horizontal member 70. The horizontal member is fixed to still another member 71 whereby both members are vertically movable by the piston 72 of an air cylinder motor 75 fixed to the carriage 31. The members 70 and 71 (and other structure described below) thus form a vertically movable carriage 80 mounted on the horizontally movable carriage 31. In FIG. 3 a guide rod 81 is shown as fixed in a bore 82. A bearing 85 is secured to the two horizontal members 70 and 71 whereby the carriage 80 is guided on the guide rod 81. Although not shown in FIG. 3 in order to simplify the drawing, another such guide rod is provided on the other side of the apparatus as illustrated in FIG. 2.

Figure 4:
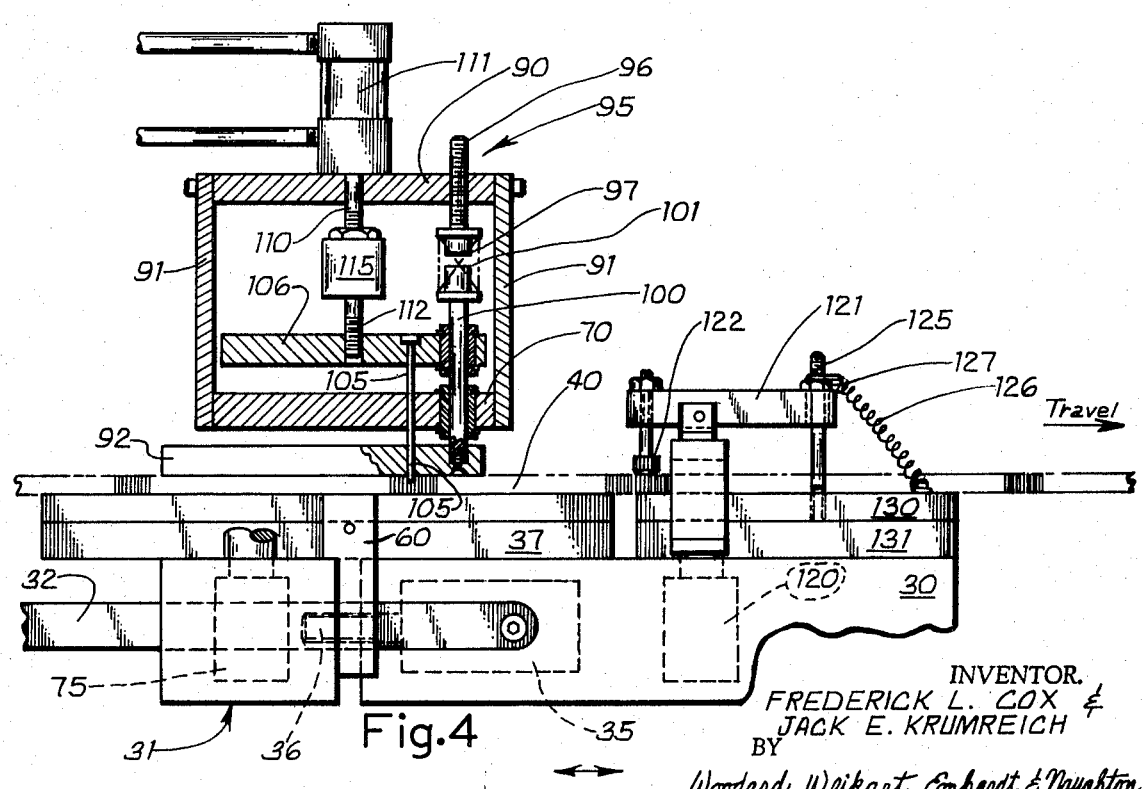
FIG. 4 is a vertical section taken along line 4—4 of FIG. 3 in the direction of the arrows.

The vertically movable carriage further includes a horizontal plate 90 which is fixed to the horizontal member 70 by vertical members 91. A pressure pad 92 is mounted on the vertically movable carriage by a pair of rod and spring assemblies 95 (only one shown in FIG. 4 for simplicity but see FIG. 2). Each rod and spring assembly includes a threaded portion 96 fixed to the plate 90 and spring 97 as well as a rod 100. The spring 97 may fix the members 96 and 100 together but preferably positive limit meanS 101 are provided for limiting downward movement of the rod 100 relative to the member 90. The pressure pad 92 is fixed to the lower ends of the members 100.

An alignment pin 105 is fixed to a horizontal plate 106. The alignment pin extends through the horizontal member 70 and the pressure pad 92. The alignment pin may be lowered from the illustrated position by projection of the piston 110 of the cylinder 111 mounted on the plate 90, said piston 110 being attached to the plate 106 by threaded member 112 and coupling 115. The pressure pad 92 is raised away from the honeycomb pad 40 when the cylinder 75 is projected and is pressed against the honeycomb pad when the piston 72 of the cylinder 75 is retracted.

An air cylinder motor 120 is mounted in the base 30 and has its piston pivoted to a lever 121, one end of which is fixed to a clamp 122 and the other end of which is secured to a fixed rod 125. The spring 126 holds the nut 127 and the lever 121 downward. Thus, when the piston of the air cylinder 120 is retracted, the clamp 122 is forced downward against the honeycomb pad and holds it against horizontal plates 130 and 131 fixed to the base 30.

The welding circuit for the apparatus includes the "hot" line 135 which is connected to the electrode 50, the electrode, the workpiece, i.e. the honeycomb pad, the apparatus itself, and the ground line 136 connected to the apparatus. The various air cylinders are operated by an electrical valve 137 (FIG. 2) which is cycled and controlled according to the sequence described below by a series of cams (not shown) driven by an electrical motor (not shown). Air pressure to the valve is supplied through the line 140 and exhaust air moves through the line 141.

Referring now to FIG. 6 the sequence of operation of the apparatus can be described in connection with the schematic illustration. As mentioned, the corrugated ribbon is closed and tack welded in a loop and started through the apparatus. The "A" cylinders 75 are operated to move the vertically movable carriage downwardly so that the pad 92 is in clamping engagement with the two ribbons. Because the pin 105 projects through the clamping pad 92, it also is in engagement with the contacting ribbons and is seated in a "cell" between the ribbons. The alignment pin 105 contacts the ribbons first before the pressure pad 92. If the ribbons are out of position, the pointed pin 105 moves them into alignment before the pressure pad 92 contacts the ribbons. The electrode 50 is positioned according to the location of the alignment pin 105. Therefore, with the ribbon properly located relative to the alignment pin, the electrode is oriented to place the weld in the proper location.

Cylinder "B" or 111 is then operated to extend its piston and to thereby fully seat the alignment pin in the cell. Cylinder "E" or 55 then retracts its piston allowing spring 56 to project the electrode 50 against the ribbon in readiness for welding. Cylinder "D" or 120 projects raising the clamp 122. Cylinder "C" or 35 retracts moving the carriage 31 rightwardly as viewed in FIG. 6. The honeycomb pad moves with the carriage because of the clamping action of the clamping pad 92 and because of the alignment pin 105 being seated in the cell. An actuating arm 150 (FIG. 3) fixed to the carriage contacts the actuating lever of a microswitch 151 actuating the electrode 50 and causing welding.

Cylinder "E" projects causing the cam 52 to withdraw the electrode 50 and move it away from the ribbon. Cylinder "B" retracts allowing the alignment pin 105 to raise within the cell. Cylinder "D" retracts causing the clamp 122 to engage the honeycomb and hold it in place against the base. Cylinder "A" projects its piston raising the pressure pad away from the honeycomb and withdrawing the pin 105 from the cell. Cylinder "C" then projects its piston moving the entire carriage 31 and 80 leftwardly, as viewed in FIG. 6, back to its starting position.

It will be evident from the above description that this invention provides an apparatus for making uniform honeycomb pad. It will also be evident that the apparatus of this invention reduces the cost of fabrication of honeycomb pad. The number of spot welds made can be adjusted merely by adjusting the travel of the carriage 31.

What is claimed is:

1. Honeycomb ribbon pad manufacturing apparatus comprising a base, a first clamping means mounted on said base and adapted to grip and hold the pad relative to the base, a carriage movably mounted on said base for movement toward and away from said first clamping means, a means movably supporting said carriage for movement in a horizontal direction, a second clamping means mounted on said carriage and adapted to grip the ribbons of said pad and hold them relative to said carriage, a welding electrode mounted on said carriage and movable into and out of engagement with said ribbons, a means mounting said electrode to said carriage for moving said electrode in said horizontal direction with said carriage, a means mounting said second clamping means to said carriage for moving said pad in said horizontal direction with said carriage, a means for releasing said first clamping means throughout the period of movement of said carriage, and means for aligning and holding the ribbons relative to one another and in predetermined relation to said electrode.

2. The honeycomb ribbon pad manufacturing apparatus of claim 1
wherein said means for aligning and holding comprises an alignment pin formed to fit vertically into a cell between the ribbons of said pad, said alignment pin being mounted on said carriage and projecting through the second clamping means whereby said pin is moved into a cell before said second clamping means engages the ribbons defining said cell.

3. The honeycomb ribbon pad manufacturing apparatus of claim 2 wherein said welding electrode is moved into contact with said ribbon by a spring acting between said carriage and said electrode, said apparatus including cam means movably mounted on said carriage for limiting and determining the extent of movement of said electrode against said ribbon as forced by said spring, and means for moving said cam between an electrode projected position and an electrode retracted position.

4. The honeycomb ribbon pad manufacturing apparatus of claim 2 wherein said carriage and second clamping means additionally comprises an anvil fixed to said carriage and adapted to support said honeycomb pad, a fixed guide means secured to said carriage and providing a limit for one side of said honeycomb ribbon pad, and a spring biased guide member mounted on said carriage and acting to hold said pad against said guide means.

5. The honeycomb ribbon pad manufacturing apparatus of claim 4 wherein:
said first clamping means has a movable piston rod with a lever mounted thereto, said lever has a ribbon clamp lockingly engageable with said ribbons as said piston rod forces said lever towards said base.

6. The honeycomb ribbon pad manufacturing apparatus of claim 4 wherein:

said carriage has upper and lower portions horizontally movable as a unit with said ribbons normally disposable therebetween, said carriage has a pair of cylinder mOtors with one motor operable to control the vertical distance between said portions and the other motor operable to raise and lower said alignment pin; and, said second clamping means has a horizontal plate springingly suspended form said upper portion.

7. The honeycomb ribbon pad manufacturing apparatus of claim 6 wherein:

said upper portion has stop means limiting the upward vertical movement of said horizontal plate.

8. The honeycomb ribbon pad manufacturing apparatus of claim 7 wherein:

said upper portion has means therein adjustable to control the vertical positioning of said alignment pin with respect to said horizontal plate.

9. The honeycomb ribbon pad manufacturing apparatus of claim 1 wherein:

said first clamping means is operable to release said pad prior to horizontal movement of said carriage.

* * * * *

UNITED STATES PATENT OFFICE
CERTIFICATE OF CORRECTION

Patent No. 3,671,711   Dated June 20, 1972

Inventor(s) Frederick L. Cox and Jack E. Krumreich, Inventors

It is certified that error appears in the above-identified patent and that said Letters Patent are hereby corrected as shown below:

Column 1, line 30 "meanS" should be --means--

Column 2, line 8 "h0neycomb" should be --honeycomb--

Column 3, line 16 "meanS" should be --means--

Column 5, line 3 "M0tors" should be --motors--

Column 5, line 8 "form" should be --from--

Signed and sealed this 26th day of December 1972.

(SEAL)
Attest:

EDWARD M. FLETCHER, JR.                ROBERT GOTTSCHALK
Attesting Officer                      Commissioner of Patents